United States Patent
Yamagishi

(10) Patent No.: US 8,718,200 B2
(45) Date of Patent: May 6, 2014

(54) SCALING DECISION DEVICE AND METHOD FOR DECIDING SCALING VALUE USED IN NORMALIZATION OF SIGNAL

(75) Inventor: Toshiyuki Yamagishi, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 124 days.

(21) Appl. No.: 13/423,450

(22) Filed: Mar. 19, 2012

(65) Prior Publication Data

US 2013/0136214 A1    May 30, 2013

(30) Foreign Application Priority Data

Nov. 28, 2011    (JP) .................................. 2011-258691

(51) Int. Cl.
  *H04L 27/06*    (2006.01)
  *H04L 27/08*    (2006.01)
(52) U.S. Cl.
  USPC ........................................................ 375/340
(58) Field of Classification Search
  USPC ........................................................ 375/340
  See application file for complete search history.

(56) References Cited

U.S. PATENT DOCUMENTS

| | | | | |
|---|---|---|---|---|
| 7,573,947 | B2 * | 8/2009 | Arad | 375/295 |
| 2007/0254592 | A1 * | 11/2007 | McCallister et al. | 455/67.11 |
| 2009/0074042 | A1 * | 3/2009 | Lin | 375/224 |

FOREIGN PATENT DOCUMENTS

| | | |
|---|---|---|
| JP | 3756122 | 1/2006 |
| JP | 2008-153751 | 7/2008 |
| JP | 4629223 | 11/2010 |

* cited by examiner

*Primary Examiner* — Erin File
(74) *Attorney, Agent, or Firm* — Oblon, Spivak, McClelland, Maier & Neustadt, L.L.P.

(57) ABSTRACT

According to one embodiment, a scaling decision device includes a first decision unit and a second decision unit. The first decision unit decides, based on a plurality of input signals, a K-th smallest signal of the plurality of input signals or a range to which the K-th smallest signal belongs of a plurality of ranges which classify the plurality of input signals by intensities. The second decision unit decides, based on a decision result of the first decision unit, a scaling value which prevents the K-th smallest signal from being submerged in quantization errors by normalization.

10 Claims, 7 Drawing Sheets

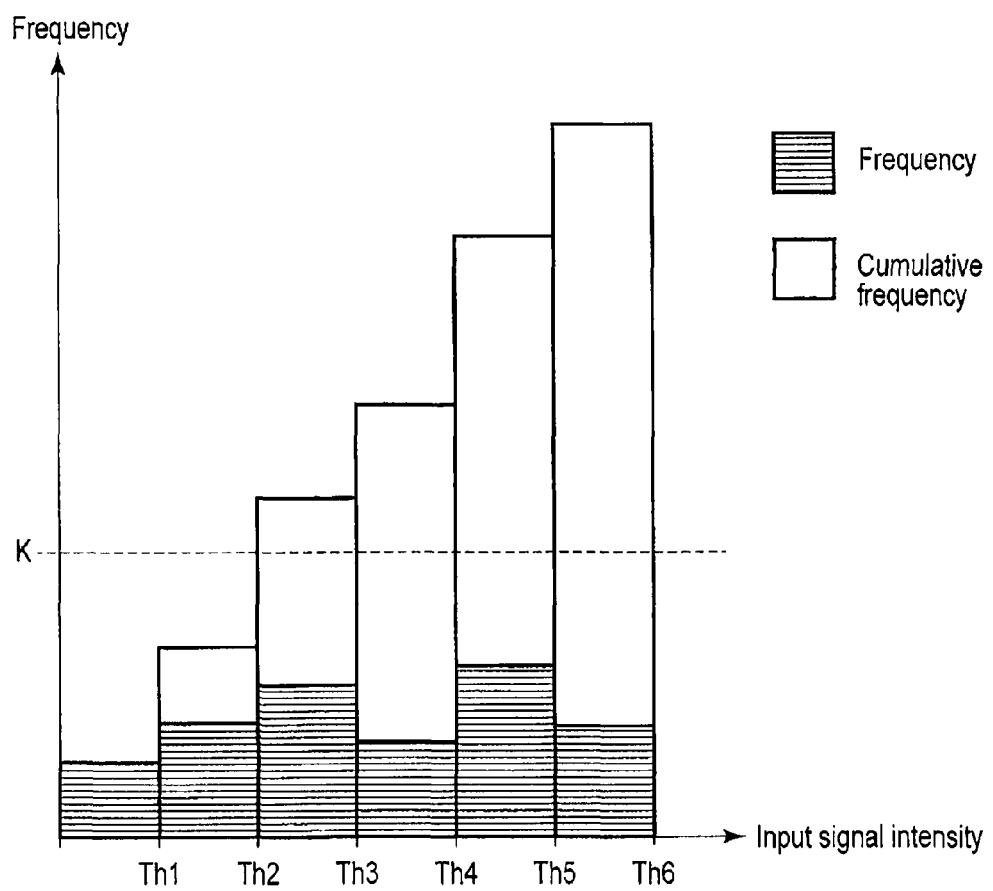
F I G. 2

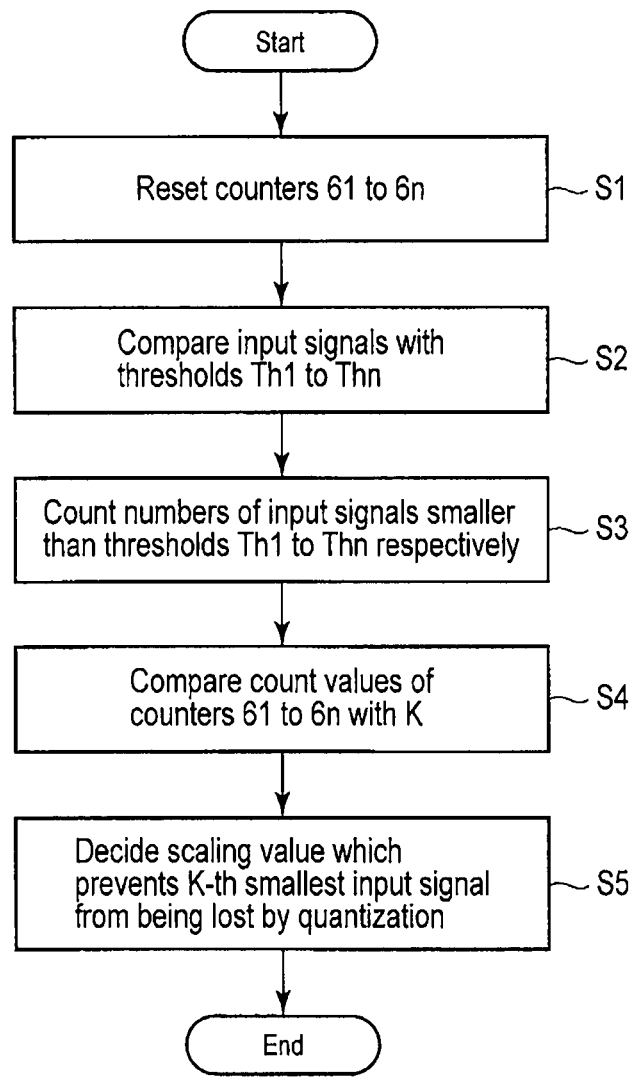
F I G. 3

| Communication standard | The number of spatial streams | Modulation method | Encoding ratio | Number of antennas | | Number of subcarriers | Number of input signals | K |
|---|---|---|---|---|---|---|---|---|
| | | | | Transmission | Reception | | | |
| ..... | ..... | ..... | ..... | ..... | ..... | ..... | ..... | ..... |

20

F I G. 6

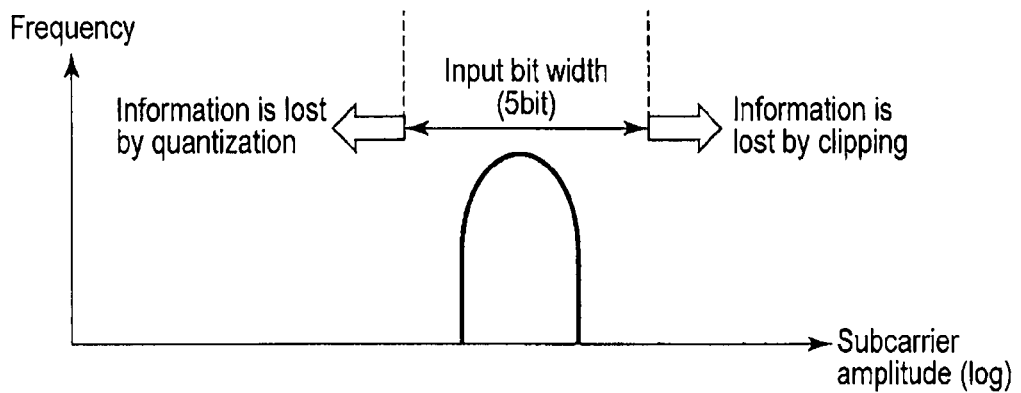
F I G. 7
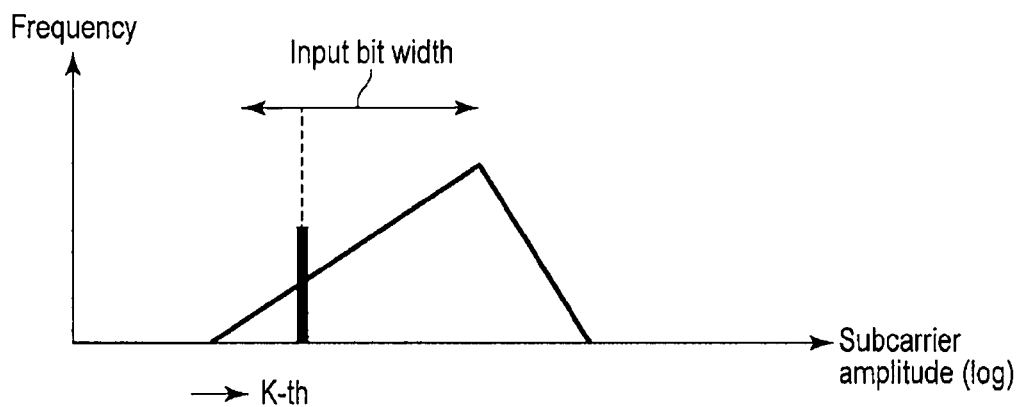
F I G. 8

SCALING DECISION DEVICE AND METHOD FOR DECIDING SCALING VALUE USED IN NORMALIZATION OF SIGNAL

CROSS-REFERENCE TO RELATED APPLICATIONS

This application is based upon and claims the benefit of priority from prior Japanese Patent Application No. 2011-258691, filed Nov. 28, 2011, the entire contents of which are incorporated herein by reference.

FIELD

Embodiments described herein relate generally to a scaling decision device and method for deciding a scaling value used in normalization of a signal.

BACKGROUND

An error correction technique influences a communication performance in wireless communications in which a communication signal essentially suffers some losses due to fading. As one type of error correction decoders for wireless communications, a soft-decision decoder, which has an input bit width of a plurality of bits so as to improve a reception performance, is known. The reception performance of the error correction decoder is improved when a bit width is increased, but that decoder has a tradeoff relationship, that is, an increase in bit width results in an increase in area, an increase in consumption power, and a decrease in maximum operation frequency. In order to relax this tradeoff relationship, an input signal of the soft-decision decoder is normalized in advance to a scale suited to decoding.

In a first example of normalization processing, a difference of maximum and minimum values or variance of amplitudes of reception subcarriers is used as a scaling criterion in an OFDM (Orthogonal Frequency Division Multiplex) receiver.

In a second example of the normalization processing, scaling is executed with reference to a mode value of log-likelihood ratios input to an error correction decoder.

The first and second examples of the normalization processing can obtain better results than a case without any scaling or a simple scaling method with reference to a power average of subcarriers. However, depending on multichannel fading situations, it is often difficult to perfectly apply the first and second examples of the normalization processing.

BRIEF DESCRIPTION OF THE DRAWINGS

FIG. 2 is a graph showing an example of a cumulative histogram generated based on outputs from counters;

FIG. 3 is a flowchart showing an example of a processing of a scaling decision device according to the first embodiment;

FIG. 6 is a diagram showing an example of a table included in the scaling decision device according to the third embodiment;

FIG. 7 is a graph showing an example of a relationship between subcarrier amplitudes and frequencies; and FIG. 8 is a graph showing an example of a relationship between a scaling value and a input bit width according to a fourth embodiment.

DETAILED DESCRIPTION

Figure 1:
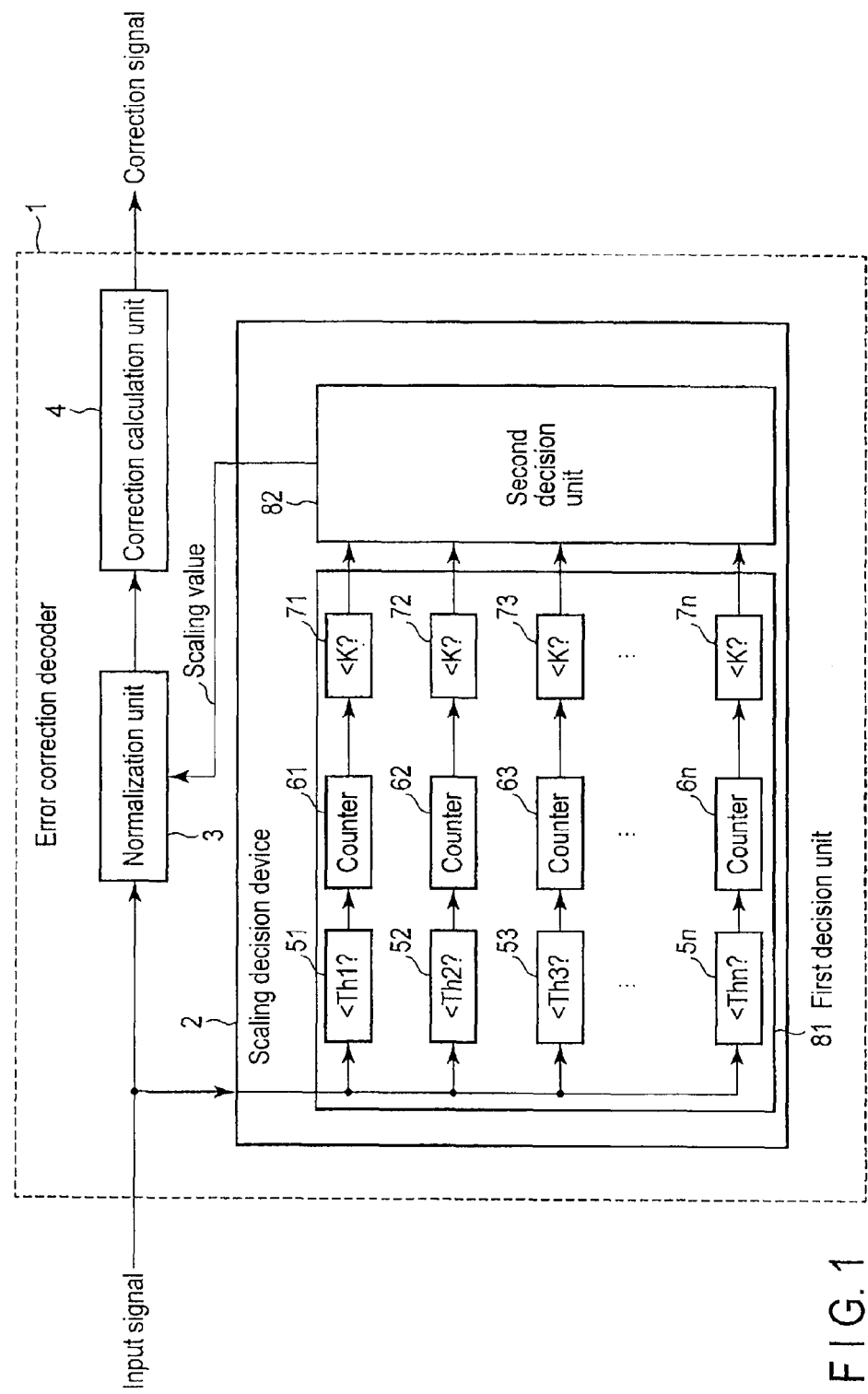
FIG. 1 is a block diagram showing an example of an arrangement of an error correction decoder according to a first embodiment.

In general, according to one embodiment, a scaling decision device includes a first decision unit and a second decision unit. The first decision unit decides, based on a plurality of input signals, a K-th smallest signal of the plurality of input signals or a range to which the K-th smallest signal belongs of a plurality of ranges which classify the plurality of input signals by intensities. The second decision unit decides, based on a decision result of the first decision unit, a scaling value which prevents the K-th smallest signal from being submerged in quantization errors by normalization.

Respective embodiments will be described hereinafter with reference to the drawings. Note that in the following description, the same reference numerals denote nearly or substantially the same functions and components, and a description will be given as needed.

First Embodiment

This embodiment will explain a scaling decision device for controlling the number of subcarriers submerged (included) in quantization errors.

This embodiment will exemplify a case in which the scaling decision device is included in an error correction decoder of a wireless receiver. This device can reduce a circuit area and consumption power of the wireless receiver, and can attain a high reception performance in a fading environment.

A scaling value decided by the scaling decision device is used to normalize log-likelihood ratio inputs of the error correction decoder.

FIG. 1 is a block diagram showing an example of an arrangement of the error correction decoder according to this embodiment.

The error correction decoder 1 receives an input signal, and outputs an error-corrected correction signal. The error correction decoder 1 includes a scaling decision device 2, a normalization unit 3, and a correction calculation unit 4 which executes an error correction decoding calculation.

The scaling decision device 2 calculates a scaling value used in normalization based on input signals, and provides the scaling value to the normalization unit 3.

The scaling decision device 2 includes a first decision unit 81 which includes threshold comparators 51 to 5n, counters 61 to 6n, and cumulative comparators 71 to 7n, and a second decision unit 82.

The error correction decoder 1 can process a signal with a broad dynamic range, and receives an input signal having a first bit width. In this embodiment, assume that an input signal of the error correction decoder 1 is, for example, a 10-bit signal.

By contrast, in order to avoid an increase in hardware area and an increase in consumption power, an input width of the correction calculation unit 4 is a second bit width smaller than the first bit width of the input signal. In this embodiment, assume that the input width of the correction calculation unit 4 is, for example, a 5-bit width.

The normalization unit 3 applies an appropriate normalization calculation to a 10-bit input signal to quantize that signal to a 5-bit signal, and provides a normalized signal to the correction calculation unit 4. The scaling decision device 2 decides a normalization parameter used in the processing of this normalization unit 3.

The scaling decision device 2 calculates a K-th smallest value of input signals, and decides the scaling value based on the K-th smallest value. The K value is qualitatively set as the number of input signals which are permitted to be lost due to quantization noise.

The K value is required to assume a larger value with increasing the number of input signals, and to assume a smaller value with increasing encoding ratio if the number of input signals remains the same. The K value is set in advance based on the number of input signals and encoding ratio, and is held in a nonvolatile storage device such as a ROM (Read Only Memory).

The threshold comparators 51 to 5n are respectively set with thresholds Th1 to Thn indicating boundaries of input signal intensities used to generate a cumulative histogram of input signals. The thresholds Th1 to Thn have a relationship of Th1<Th2<...<Thn−1<Thn. In this embodiment, assume that the cumulative histogram in which input signal intensities are divided into n ranges is generated.

The threshold comparators 51 to 5n determine whether or not input signals input to the scaling decision device 2 are smaller than the respective thresholds Th1 to Thn. When the threshold comparators 51 to 5n respectively determine that the input signal is smaller than the thresholds Th1 to Thn, the threshold comparators 51 to 5n respectively provide a count-up instruction to the counters 61 to 6n.

The counters 61 to 6n increment their count values when the counters 61 to 6n receive the count-up instruction, and provide the count values to the cumulative comparators 71 to 7n. Thus, cumulative frequencies of input signals smaller than the respective thresholds Th1 to Thn are calculated.

FIG. 2 is a graph showing an example of the cumulative histogram generated based on the outputs from the counters 61 to 6n. In FIG. 2, frequencies and cumulative frequencies are displayed to overlap each other.

When the counters 61 to 6n are reset before an input signal is input, and a given number of input signals are input, the output values of the counters 61 to 6n represent the cumulative histogram. In FIG. 2, the cumulative histogram is generated by classifying input signals into six signal intensity ranges.

The cumulative comparators 71 to 7n respectively compare cumulative frequencies as the count values from the counters 61 to 6n with K, and provide comparison results to the second decision unit 82.

As described above, the first decision unit 81 generates a signal that indicates to which signal intensity range the K-th smallest input signal belongs, and the second decision unit 82 can obtain this signal.

In the example of FIG. 2, the comparison results of the cumulative comparators 71 and 72 indicate "false", and those of the cumulative comparators 73 to 7n indicate "true".

The second decision unit 82 recognizes that the K-th smallest input signal belongs to the third signal intensity range (equal to or larger than Th2 and smaller than Th3) on the turn of "false" and "true", and decides a scaling value so as to prevent the K-th smallest input signal from being lost by quantization.

For example, the second decision unit 82 determines the scaling value so that the K-th smallest input signal belongs to the input bit width of the correction calculation unit 4. For example, when the input width of the correction calculation unit 4 is defined by signed 5 bits, an input range ranges from −16 to +15 [LSB (Least Significant Bit)]. When scaling is executed so that the value of Th2 corresponds to a value equal to or larger than 1 [LSB] (for example, 2 [LSB]), information of the K-th smallest subcarrier can be prevented from being lost. The second decision unit 82 calculates the scaling value which scales the value of Th2 to 2 [LSB], and outputs that scaling value to the normalization unit 3.

The normalization unit 3 normalizes each input signal to an appropriate scale by multiplying or dividing an input signal to be normalized by the scaling value from the scaling decision device 2.

Furthermore, the normalization unit 3 applies quantization processing such as rounding to the normalized input signal to be matched with the bit width of the correction calculation unit 4 used to make error correction decoding calculations.

The correction calculation unit 4 receives the signal which has undergone the quantization processing by the normalization unit 3, and applies error correction decoding processing to this signal.

FIG. 3 is a flowchart showing an example of the processing of the scaling decision device 2 according to this embodiment.

In step S1, the count values of the counters 61 to 6n are reset.

In step S2, the threshold comparators 51 to 5n compare an input signal with the thresholds Th1 to Thn set in themselves. If the input signal is smaller than the respective thresholds Th1 to Thn, the threshold comparators 51 to 5n provide count-up instructions to the corresponding counters 61 to 6n.

In step S3, the counters 61 to 6n increment their count values when they receive the count-up instructions from the corresponding threshold comparators 51 to 5n. Thus, the numbers of input signals smaller than the thresholds Th1 to Thn are calculated with respect to the respective thresholds Th1 to Thn. The counters 61 to 6n provide the count values to the cumulative comparators 71 to 7n.

In step S4, the cumulative comparators 71 to 7n compare cumulative frequencies as the count values from the corresponding counters 61 to 6n with K, and provide comparison results to the second decision unit 82.

In step S5, the second decision unit 82 decides a scaling value, which can prevent the K-th smallest input signal from being lost by quantization, based on a signal intensity range to which the K-th smallest input signal belongs, and provides the scaling value to the normalization unit 3.

Conventionally, when multichannel fading has occurred in wireless communications, variations of subcarriers with smaller amplitudes become much larger than those of subcarriers with larger amplitudes in association with amplitudes of reception subcarriers. For this reason, when normalization is executed by an existing scaling method, many pieces of information of reception subcarriers are submerged (included) in quantization errors as a result of normalization depending on fading situations, resulting in a reception failure. This reception failure is caused since the existing method cannot control the number of subcarriers submerged in quantization errors by scaling.

By contrast, this embodiment can control an information amount lost by the quantization processing at the input timing of the error correction decoder 1, and can execute error correction with high precision in the fading environment. This embodiment can reduce the calculation precision in the correction calculation unit 4, can reduce the circuit area, can lower consumption power, and can raise a maximum operation frequency, so as not to impair the error correction capability.

Second Embodiment

The scaling decision device 2 according to the first embodiment calculates a scaling value based on respective input signals.

On the other hand, in this embodiment, the scaling decision device 2 is incorporated in a wireless receiver, and decides a scaling value based on transmission channel estimated values.

Figure 4:
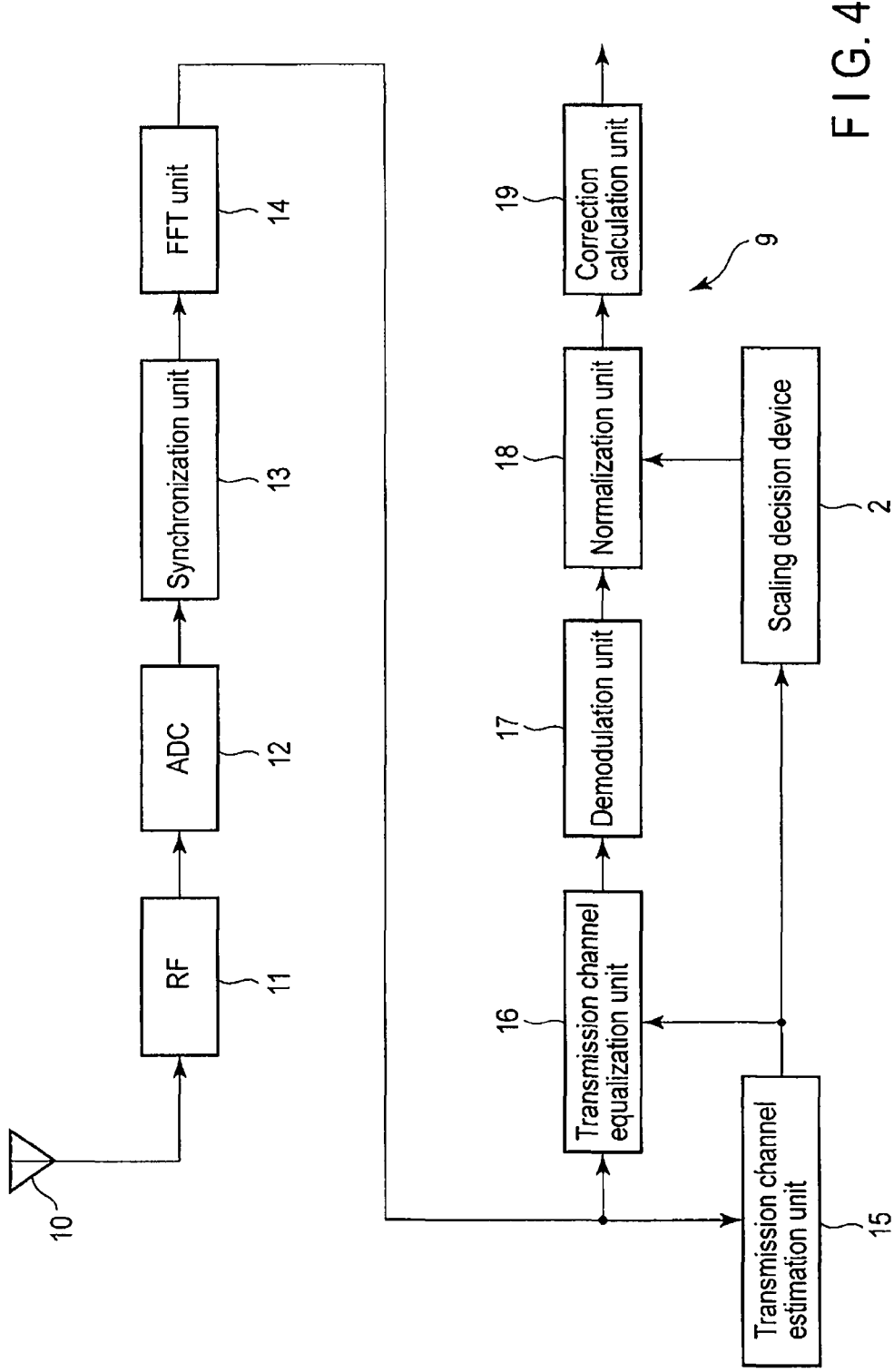
FIG. 4 is a block diagram showing an example of an arrangement of a wireless receiver according to a second embodiment.

FIG. 4 is a block diagram showing an example of an arrangement of a wireless receiver according to this embodiment.

A wireless receiver 9 has an arrangement in which the scaling decision device 2 is applied to an OFDM receiver.

A radio signal received by an antenna 10 is down-converted from a radio frequency to a baseband frequency by a high-frequency circuit 11, and is then converted into a digital signal by an analog-to-digital converter 12. After that, a synchronization unit 13 applies appropriate synchronization processing such as frequency synchronization or temporal synchronization to the digital signal, and an FFT unit 14 applies FFT (Fast Fourier Transform) calculations for respective OFDM symbols, thereby extracting subcarrier-dependent signals.

A transmission channel estimation unit 15 estimates transmission channel values of respective subcarriers based on a given signal component of these subcarrier-dependent signals.

A transmission channel equalization unit 16 equalizes signal components which carry data of the subcarrier-dependent signals, thereby generating a constellation signal.

A demodulation unit 17 generates, based on the constellation signal, an LLR (Log-Likelihood Ratio) as a log of ratios of probabilities of "1" assumed by respective transmission bit values and those of "0".

The scaling decision device 2 decides a scaling value with reference to the K-th smallest value of amplitudes of the subcarrier transmission channel estimated values based on the transmission channel estimation result, and provides this scaling value to a normalization unit 18. The operation of the scaling decision device 2 is the same as the aforementioned first embodiment.

The normalization unit 18 normalizes and quantizes the LLR output from the demodulation unit 17 based on the scaling value from the scaling decision device 2, and provides data to a correction calculation unit 19.

Inputs of the error correction decoder assume different values for respective OFDM symbols, while most of transmission channel estimated values continue to use identical values over a plurality of OFDM symbols or during a single radio frame. For this reason, with the above arrangement, a scaling value need not be re-calculated for respective OFDM symbols to reduce the number of calculations, thereby reducing consumption power.

The wireless receiver 9 according to the aforementioned embodiment executes transmission channel equalization and error correction decoding. The scaling decision device 2 decides a scaling value with reference to the K-th smallest value as a specific value of transmission channel estimated values. The normalization unit 18 normalizes and quantizes a reception signal based on the scaling value generated by the scaling decision device 2.

Then, a circuit area of the wireless receiver 9 can be reduced, consumption power can be reduced, and a maximum operation frequency can be improved.

In this embodiment, the scaling value is decided based on the transmission channel estimated values, which are kept used for a relatively long period of time in place of the input signals of the error correction decoder 1 of the aforementioned first embodiment. Thus, the frequency of calculations of the scaling value can be reduced.

Third Embodiment

This embodiment will explain a change of K in the first and second embodiments.

The K value can be switched according to, for example, the communication standard type, the number of spatial streams in communications, the wireless modulation method type, the encoding ratio of the error correction decoder 1, the number of transmission/reception antennas in MIMO (Multi-Input Multi-Output) communications, the number of subcarriers, the numbers of input signals, and so forth.

Figure 5:
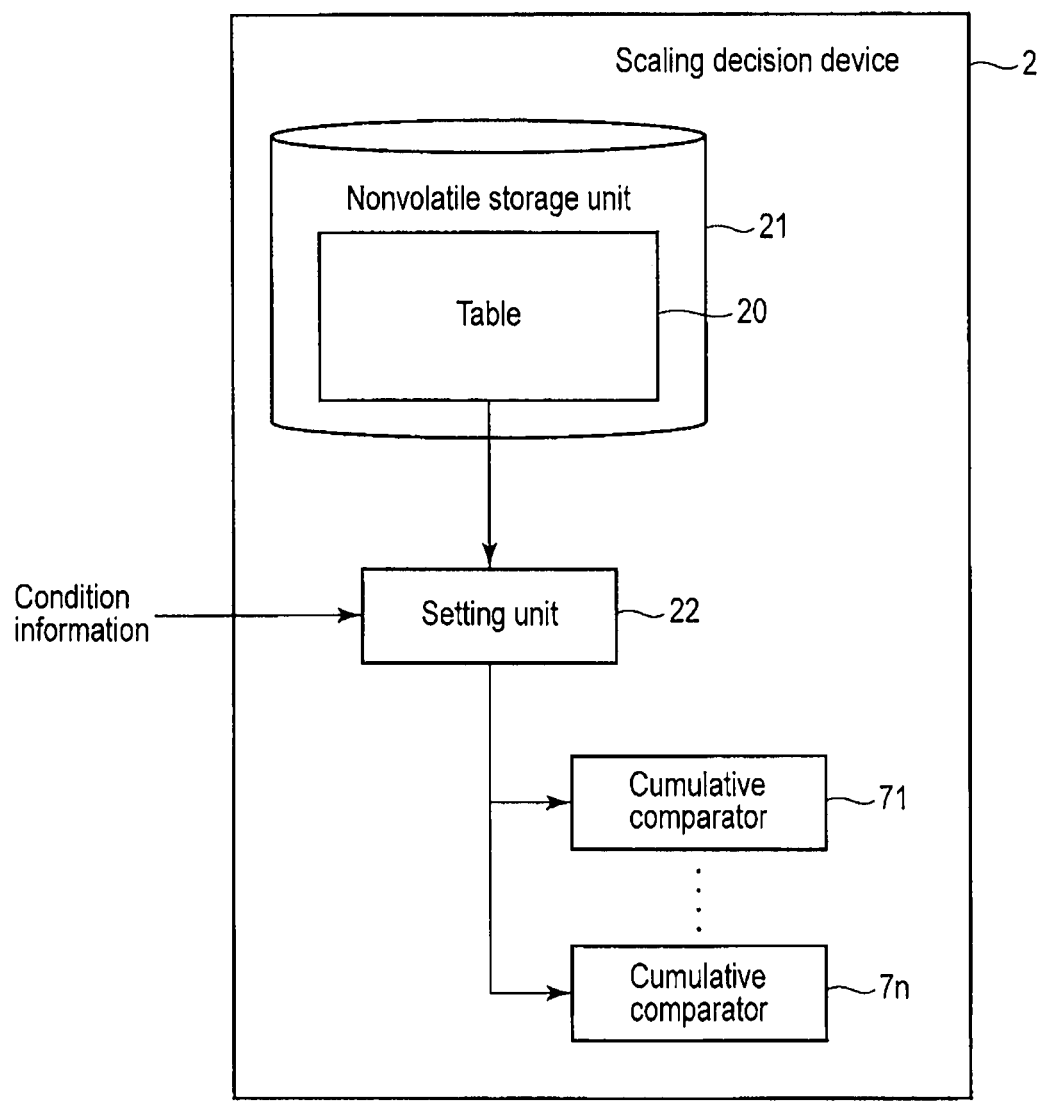
FIG. 5 is a block diagram showing an example of an arrangement of the scaling decision device according to a third embodiment.

FIG. 5 is a block diagram showing an example of the arrangement of the scaling decision device 2 according to this embodiment. FIG. 5 shows only the cumulative comparators 71 to 7n of the arrangement of the scaling decision device 2 shown in FIG. 1, and other components are not shown.

FIG. 6 shows an example of a table included in the scaling decision device 2.

The scaling decision device 2 includes a nonvolatile storage device 21 which stores a table 20, and a setting unit 22.

In the table 20, a K value is associated with the communication standard type, the number of spatial streams in communications, the wireless modulation method type, the encoding ratio of the error correction decoder 1, the number of transmission/reception antennas in MIMO communications, the number of subcarriers, the numbers of input signals, and the like.

The setting unit 22 decides a K value based on condition information required to specify a use situation (the communication standard type, the number of spatial streams in communications, the wireless modulation method type, the encoding ratio of the error correction decoder 1, the number of transmission/reception antennas in MIMO communications, the number of subcarriers, the numbers of input signals) of the scaling decision device 2, and the table 20, and sets the decided K value in the cumulative comparators 71 to 7n.

In this embodiment, appropriate K is set according to the condition information. Then, an optimal scaling value can be decided, thus obtaining an optimal error correction result and optimal reception performance.

Note that in this embodiment, the K value is decided using the table 20. Alternatively, the K value may be decided by other methods such as use of a decision tree in place of the table 20.

Fourth Embodiment

This embodiment will explain normalization using a scaling value decided by the scaling decision device 2 according to the first to third embodiments described above.

An input bit width of the error correction decoder 1 is normally set to be about 5 bits. When the input bit width is set to be smaller than about 5 bits, a correction capability lowers. When the input bit width is set to be larger than about 5 bits, a hardware size increases, resulting in an operation frequency drop.

FIG. 7 is a graph showing an example of the relationship between subcarrier amplitudes and frequencies. In FIG. 7, the abscissa plots subcarrier amplitudes, and the ordinate plots frequencies.

In order to attain correction with high precision, it is important to execute normalization so that the subcarrier amplitude distribution falls within the input bit width.

FIG. 8 is a graph showing an example of the relationship between scaling values and the input bit width. In FIG. 8, the abscissa plots subcarrier amplitudes, and the ordinate plots frequencies.

In this embodiment, the K-th smallest subcarrier amplitude is decided, and normalization which can prevent the decided subcarrier amplitude from being lost by quantization is executed.

Thus, it is guaranteed that information losses caused by quantization fall within an error correction range.

Note that K is set with reference to a smaller subcarrier with increasing encoding ratio. Also, the K value is switched according to modulation methods.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A scaling decision device, comprising:
   a first decision unit that decides, based on a plurality of input signals, a K-th smallest signal of the plurality of input signals or a range to which the K-th smallest signal belongs of a plurality of ranges which classify the plurality of input signals by intensities; and
   a second decision unit that decides, based on a decision result of the first decision unit, a scaling value which prevents the K-th smallest signal from being submerged in quantization errors by normalization,
   wherein the second decision unit decides the scaling value so that the K-th smallest signal belongs to a range of an input bit width of a correction calculation unit that executes an error correction decoding calculation for a normalized input signal.

2. The device according to claim 1, wherein the first decision unit comprises:
   a plurality of threshold comparators that respectively correspond to the plurality of ranges, and that respectively compare thresholds indicating upper limits of the corresponding ranges with the plurality of input signals;
   a plurality of counters that respectively correspond to the plurality of ranges, and that respectively count the numbers of input signals smaller than the corresponding thresholds; and
   cumulative comparators that respectively correspond to the plurality of ranges, and that respectively compare count values of the corresponding counters with a set K value, wherein
   the second decision unit decides the scaling value which prevents input signals that belong to a range having a corresponding count value not less than the set K value from being submerged in quantization errors by normalization.

3. The device according to claim 1, further comprising a setting unit that sets the K value based on at least one of a communication standard, the number of spatial streams, a modulation method, an encoding ratio, the number of antennas, the number of subcarriers, and the number of input signals.

4. The device according to claim 1, wherein the plurality of input signals are a plurality of subcarrier amplitudes or a plurality of transmission channel estimated values.

5. An error correction decoder comprising the scaling decision device of claim 1, the decoder further comprising:
   a normalization unit that normalizes a signal to be normalized based on the scaling value decided by the scaling decision device; and
   a correction calculation unit that executes an error correction decoding calculation for a signal normalized by the normalization unit.

6. An orthogonal frequency division multiplex receiver comprising the scaling decision device of claim 1,
   wherein the input signals are transmission channel estimated values of a plurality of subcarriers obtained by transmission channel estimation in an orthogonal frequency division multiplex,
   a signal to be normalized is a log-likelihood ratio obtained by demodulation in the orthogonal frequency division multiplex, and
   the receiver further comprises:
   a normalization unit that normalizes the log-likelihood ratio based on the scaling value from the scaling decision device; and
   a correction calculation unit that executes an error correction decoding calculation for a signal normalized by the normalization unit.

7. A scaling decision method, comprising:
   deciding, based on a plurality of input signals, a K-th smallest signal of the plurality of input signals or a range to which the K-th smallest signal belongs of a plurality of ranges which classify the plurality of input signals by intensities; and
   deciding a scaling value which prevents the K-th smallest signal from being submerged in quantization errors by normalization,
   wherein the deciding the scaling value decides the scaling value so that the K-th smallest signal belongs to a range of an input bit width of a correction calculation unit that executes an error correction decoding calculation for a normalized input signal.

8. The method according to claim 7, wherein
   the deciding the range to which the K-th smallest signal belongs includes:
   comparing thresholds respectively indicating upper limits of the ranges with the input signals;
   counting the numbers of input signals smaller than the thresholds, respectively; and
   comparing count values with a set K value, respectively, and
   the deciding the scaling value decides the scaling value which prevents input signals that belong to a range having a corresponding count value not less than the set K value from being submerged in quantization errors by normalization.

9. The method according to claim 7, wherein the K value is set based on at least one of a communication standard, the number of spatial streams, a modulation method, an encoding ratio, the number of antennas, the number of subcarriers, and the number of input signals.

10. The method according to claim 7, wherein the plurality of input signals are a plurality of subcarrier amplitudes or a plurality of transmission channel estimated values.

* * * * *